Figure 8:
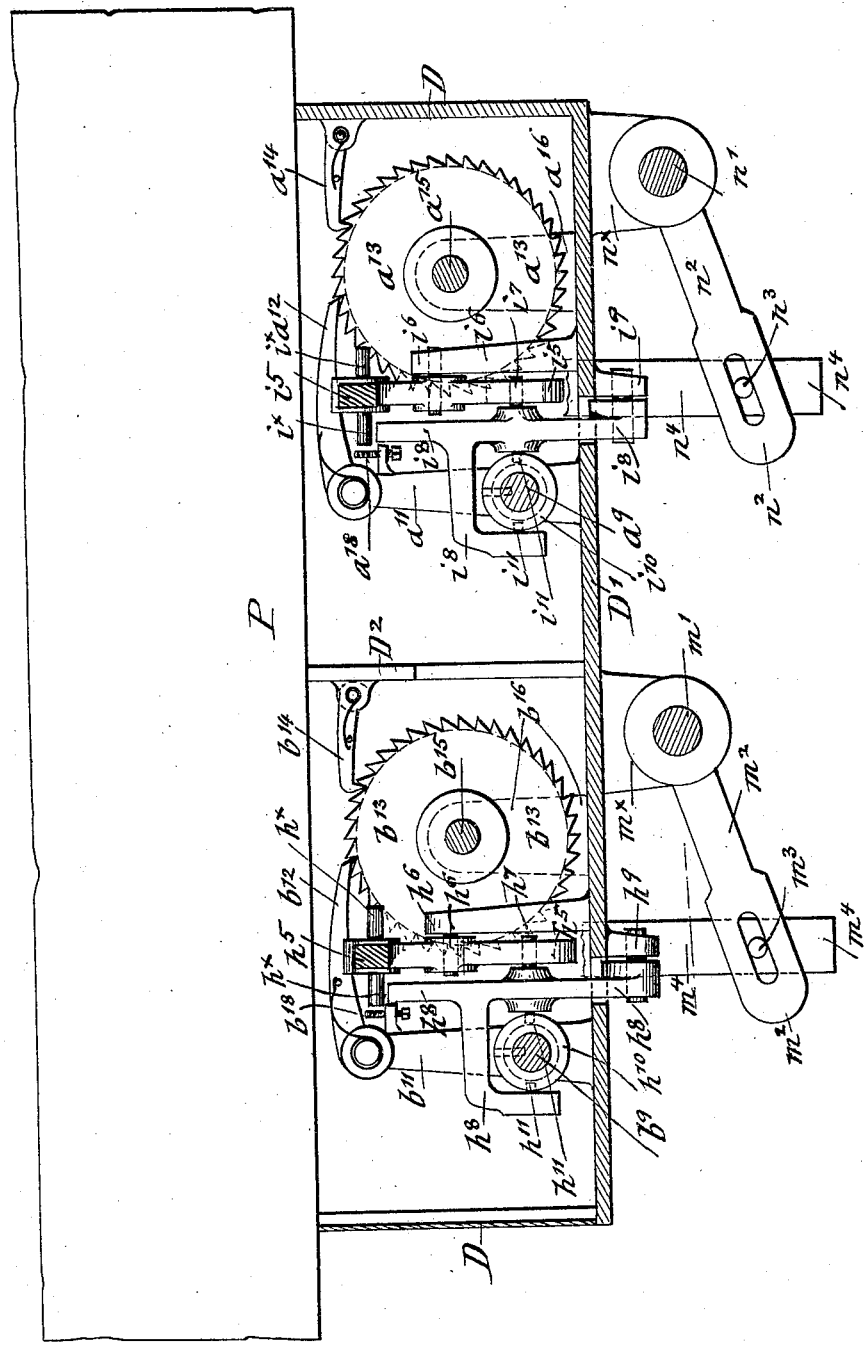

O. SPECKENBACH.
PASSENGER CONTROLLED REGISTER FOR STREET CARS.
APPLICATION FILED FEB. 3, 1909.
941,108.
Patented Nov. 23, 1909.
8 SHEETS—SHEET 1.
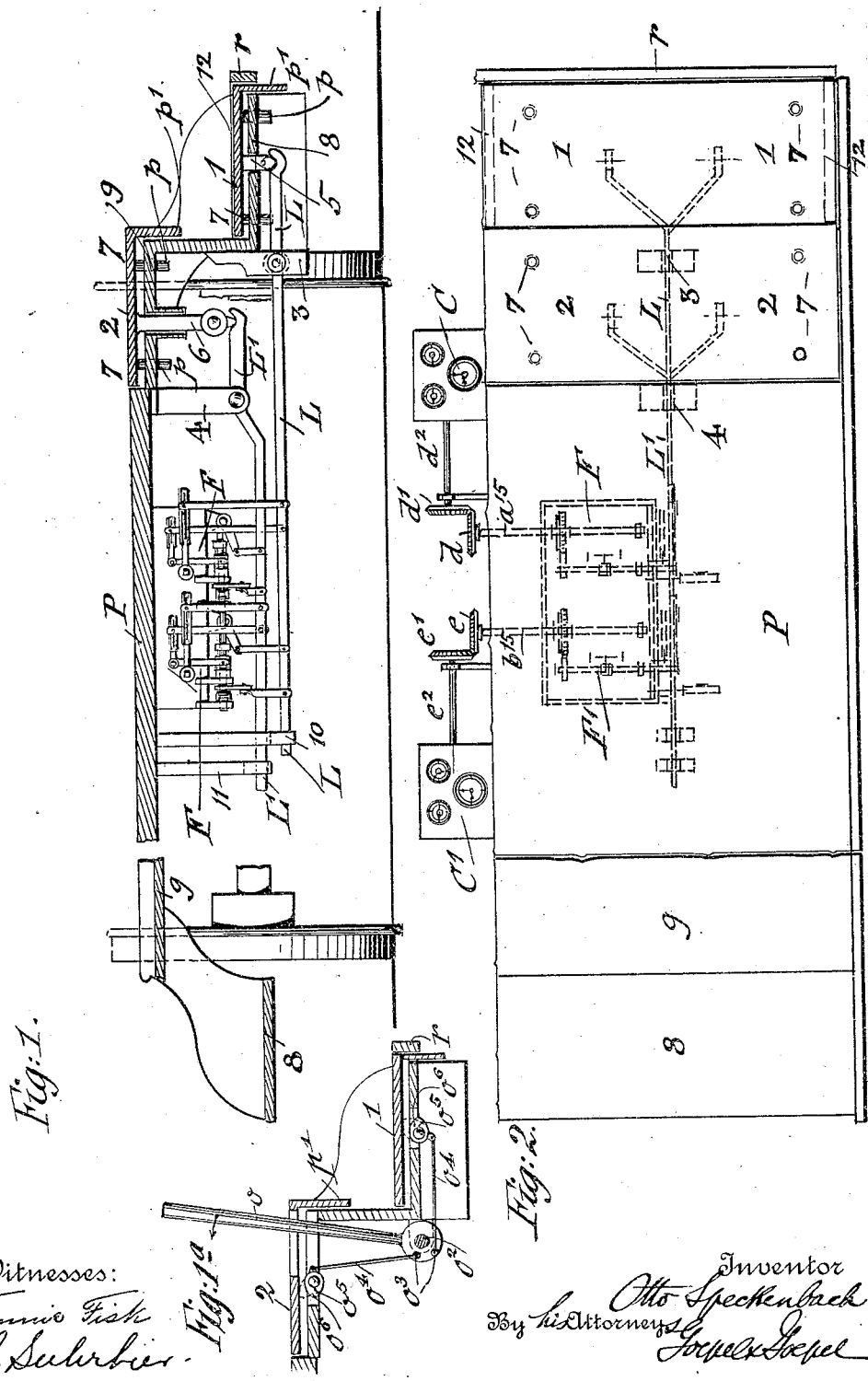

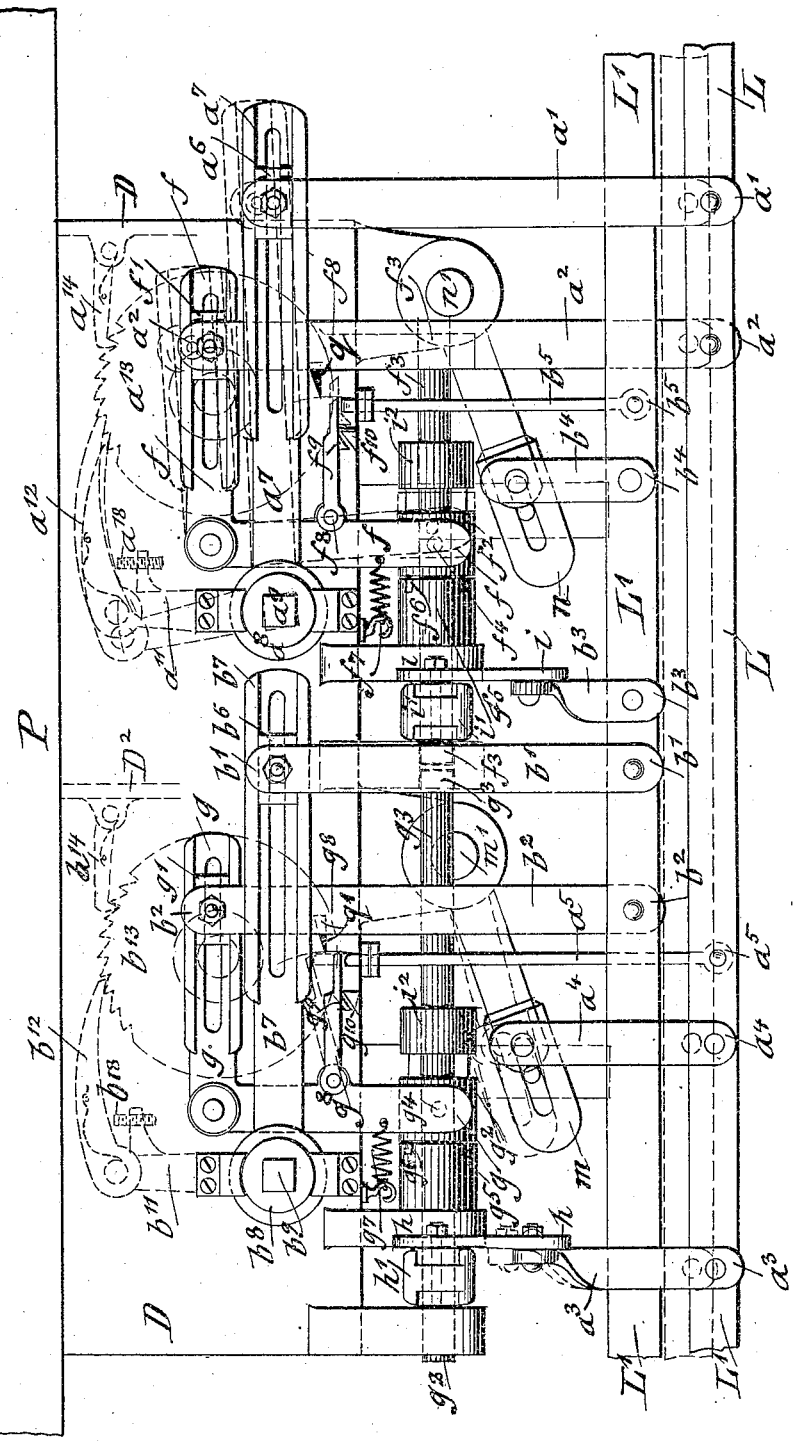

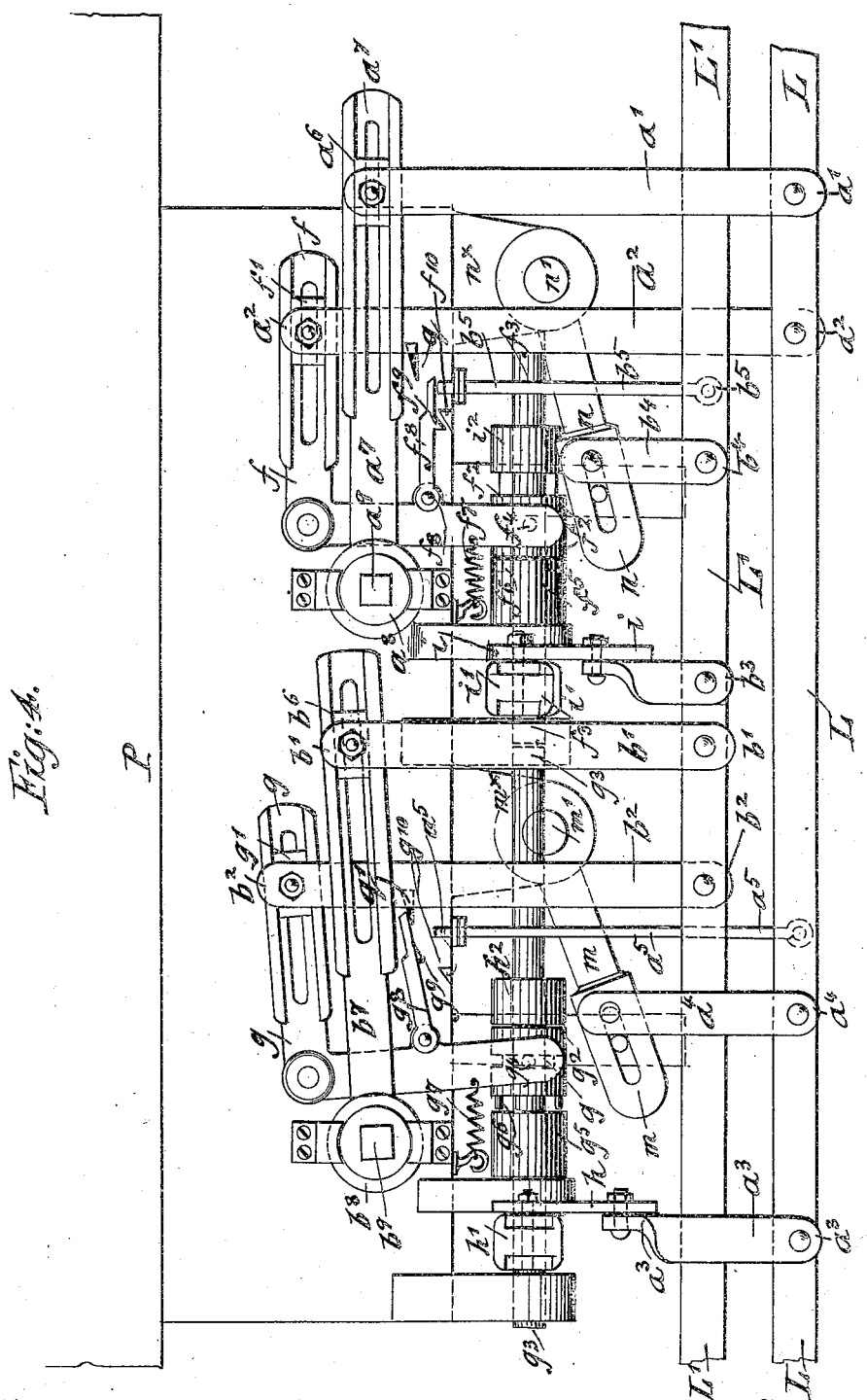

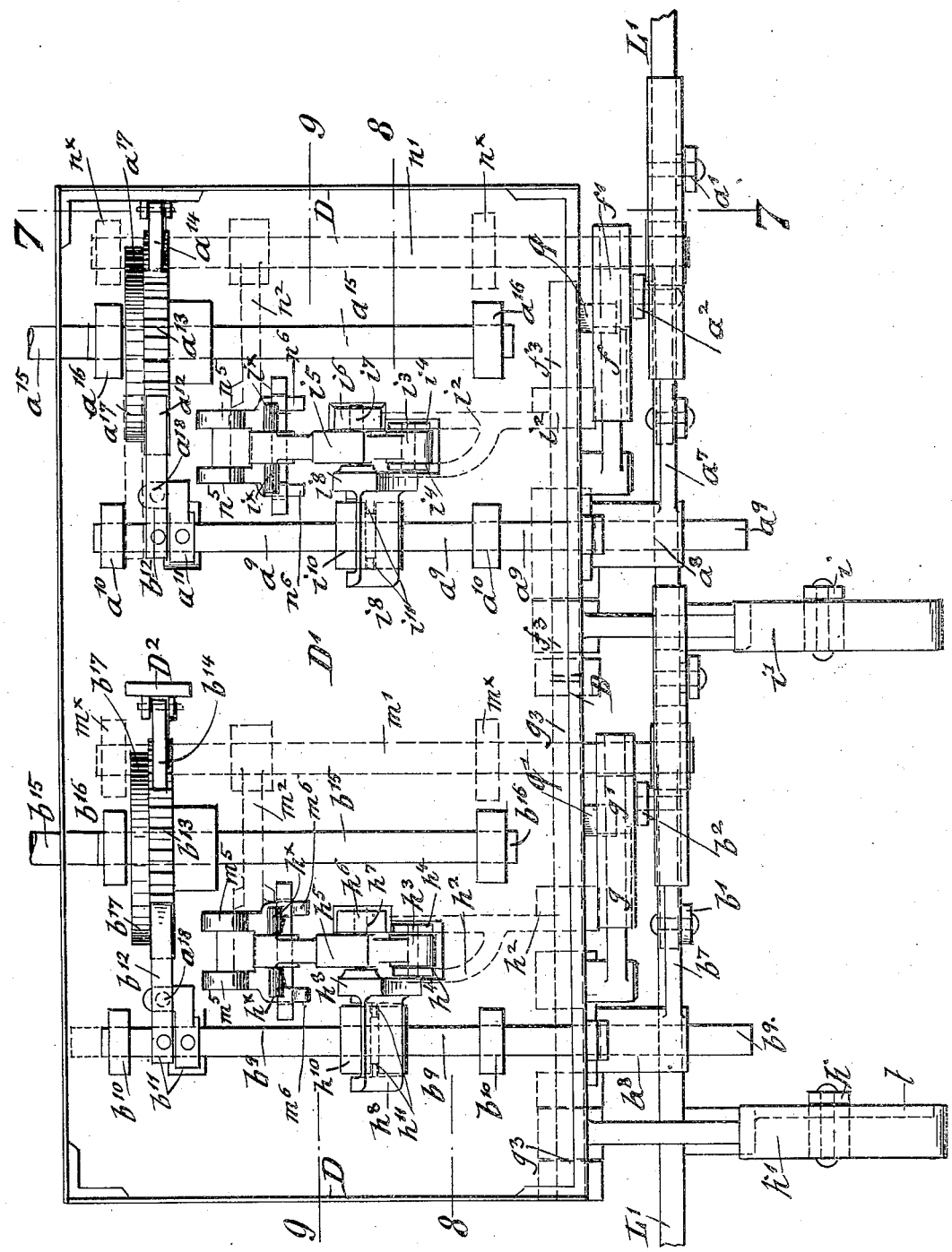

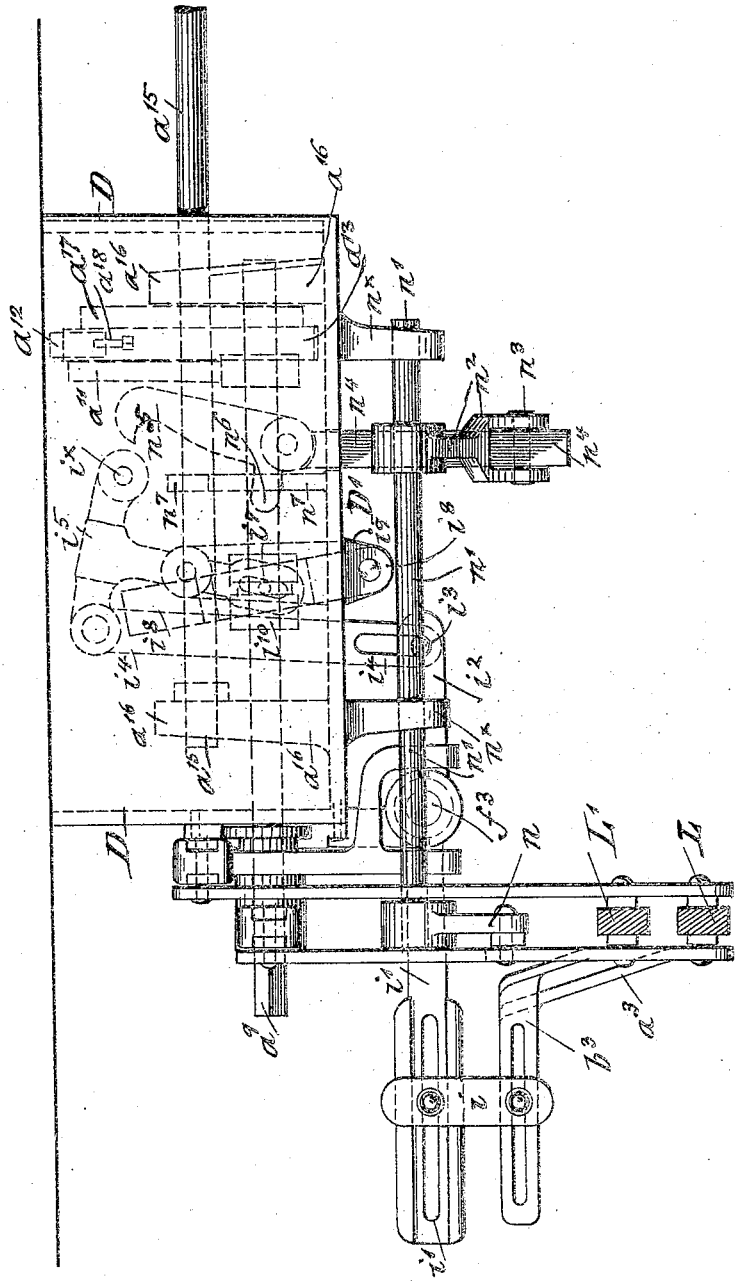

O. SPECKENBACH.
PASSENGER CONTROLLED REGISTER FOR STREET CARS.
APPLICATION FILED FEB. 3, 1909.
941,108.
Patented Nov. 23, 1909.
8 SHEETS—SHEET 6.
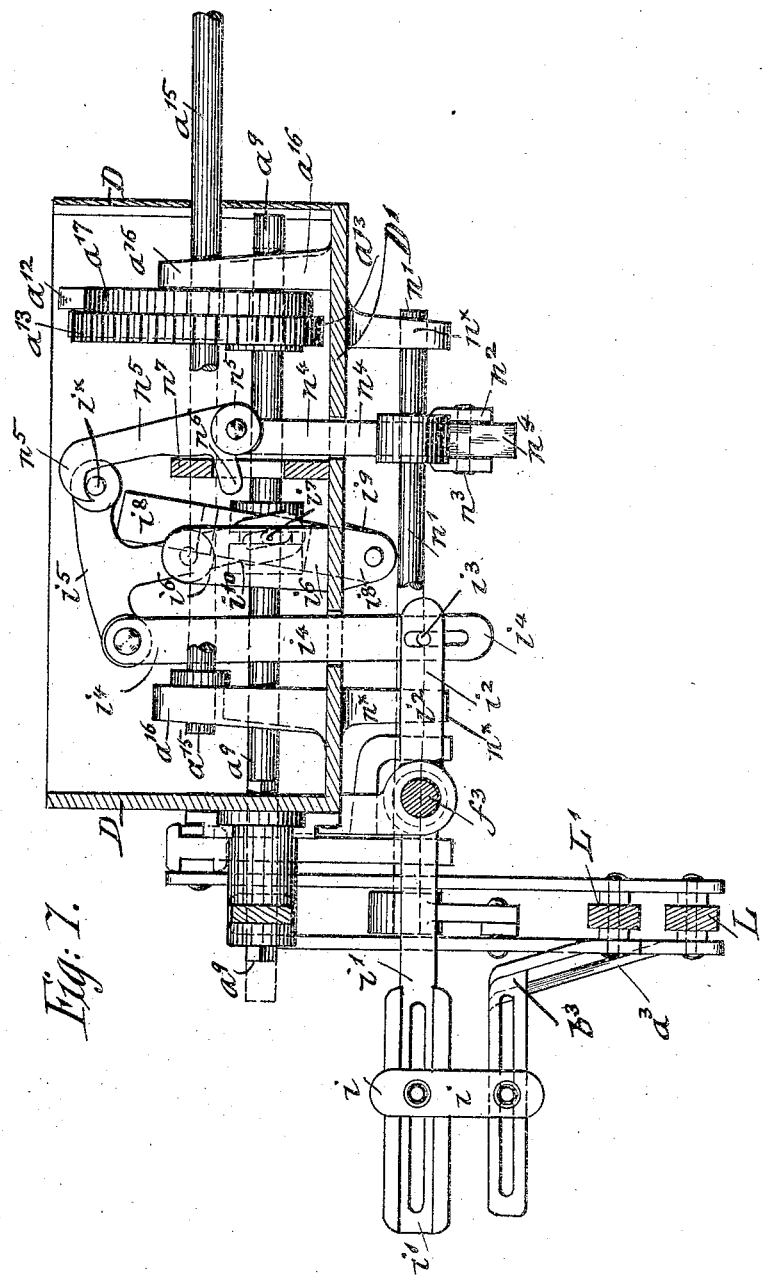
Witnesses:
Fannie Fisk
H. J. Suhrbier
Inventor
Otto Speckenbach
By his Attorneys O. SPECKENBACH.
PASSENGER CONTROLLED REGISTER FOR STREET CARS.
APPLICATION FILED FEB. 3, 1909.

941,108.

Patented Nov. 23, 1909.
8 SHEETS—SHEET 7.

Witnesses:
Fannie Fisk
H. J. Suhrbier.

Inventor
Otto Speckenbach
By his Attorneys
Sorper Goepel

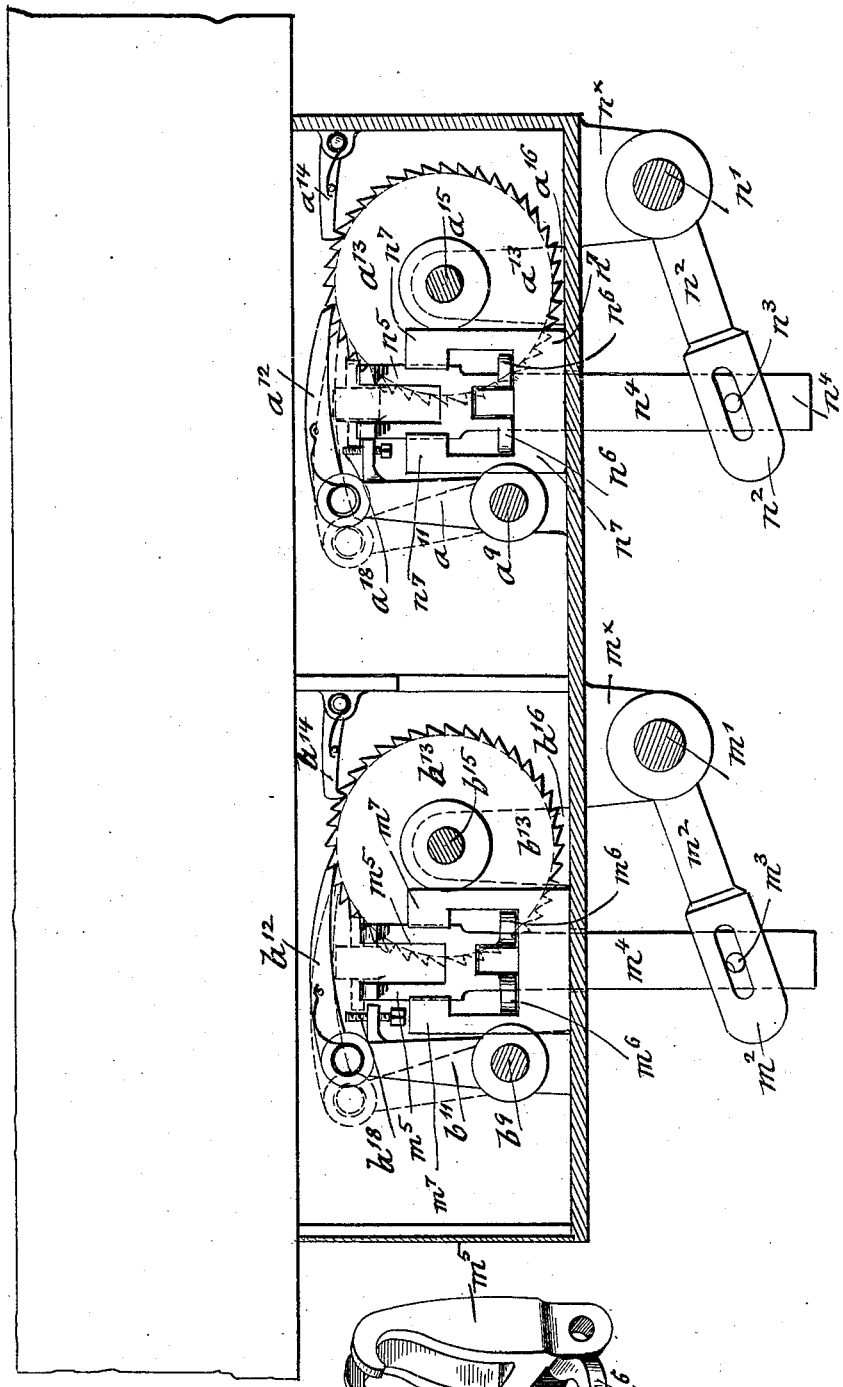

UNITED STATES PATENT OFFICE.

OTTO SPECKENBACH, OF NEW YORK, N. Y., ASSIGNOR OF ONE-HALF TO ADOLPH SIEGRIST, OF NEW YORK, N. Y.

PASSENGER-CONTROLLED REGISTER FOR STREET-CARS.

941,108.  Specification of Letters Patent.  Patented Nov. 23, 1909.

Application filed February 3, 1909. Serial No. 475,729.

*To all whom it may concern:*

Be it known that I, OTTO SPECKENBACH, a citizen of the United States of America, residing in New York, in the borough of the Bronx, county and State of New York, have invented certain new and useful Improvements in Passenger-Controlled Registers for Street-Cars, of which the following is a specification.

This invention relates to an improved controlled register for street cars, which is actuated by the passengers when getting into and on leaving the car.

A large number of fare-registering devices have been proposed heretofore for controlling the fares paid by the passengers on street cars, but notwithstanding all the care taken, the so-called "knocking down" of fares cannot be prevented as the ringing off of the fares has to be attended to by the conductor.

The object of this invention is to furnish a passenger-controlling register which is actuated by the depression of the car-steps when the passengers enter and leave the cars, the ingoing depressions of the steps and the outgoing depressions registering the number of the passengers, which are thus counted independently of the fare-register operated by the conductor, for producing the registration of the passengers in a perfectly reliable and automatic manner. For cars provided with one entrance only at the rear-end, one register is required; but for cars that are provided with entrances at opposite sides, and which are not turned around at the end of the route, two controlling registers are required, one for the going and the other for the return trip of the car; and for this purpose the invention consists of a passenger-controlled register which comprises two passenger-counting apparatus, one connected with the lower and the other with the upper step of the car, and each connected with a counter, which counters are alternately actuated by the successive depressions of the steps and the intermediate mechanism and by the return of the steps into their normal position; and the invention consists further in the special construction of each individual apparatus and additional features of construction, as will be fully described hereinafter and finally pointed out in the claims.

In the accompanying drawings, Figure 1 represents a vertical transverse section of a car-platform and steps of a street car, showing my improved passenger-controlled register for street cars in end-elevation, Fig. 1ª is a detail section of the movable steps for operating my improved register, Fig. 2 is a plan-view of Fig. 1, drawn on a larger scale, Fig. 3 is an end-elevation similar to that shown in Fig. 1, but drawn on a larger scale, Fig. 4 is an end-elevation similar to Fig. 3, but showing the position of the parts as actuated by the second step of the car, Fig. 5 is a plan-view of the passenger-controlled register on the same scale as Figs. 3 and 4, Fig. 6 is a side-elevation of the controlling register, Fig. 7 is a vertical transverse section on line 7, 7, Fig. 5, Figs. 8 and 9 are vertical transverse sections respectively on lines 8, 8 and 9, 9, Fig. 5, and Fig. 10 is a detail perspective of the double hook employed in each apparatus.

Similar reference characters indicate corresponding parts throughout the different figures of the drawings.

The passenger-controlling register is attached to the under-side of the platform P of the car and connected with the steps 1 and 2 by two horizontal levers L, L¹, which are fulcrumed to stationary hanger-straps 3 and 4 attached to the under-side of the platform. The lower step 1 is connected by two lugs 5 with the forked outer end of the lever L, and the upper step 2 by two lugs 6 with the forked outer end of the lever L¹. The steps 1 and 2 are guided by pins 7, one on the lower stationary tread 8 and the other approximately on a level with the platform on the upper stationary tread 9 of the car, as shown clearly in Figs. 1 and 2. The inner longer ends of the levers L, L¹ are made heavy enough so as to counterbalance the steps 1 and 2 and the parts of the controlling mechanisms operated thereby, so as to return them to their normal position of rest as soon as the pressure on the steps is removed. The inner longer ends of the levers L, L¹ are guided on the hook-shaped lower ends of fixed hangers 10 and 11, which are attached to the under-side of the platform P so as to steady the inner ends of the levers during their up and down motion. The passenger-controlled register itself is composed of two identical apparatus F, F¹, which are actuated by the levers L, L¹ as soon as the steps 1 and 2 are depressed by a passenger entering or leaving the car; each of said apparatus F and F¹ being connected with two independent counters C, C¹, which are supported below the platform P and operated in such a manner that the depression of the lower step 1 operates by one mechanism the counter C, while the depression of the second step 2 operates by the second mechanism F¹ the counter C¹. The levers L, L¹ are each connected with the two apparatus F, F¹ by three pivot-straps $a^1$, $a^2$, $a^4$ and $b^1$, $b^2$, $b^4$, bracket-straps $a^3$, $b^3$, and pusher-rods $a^5$, $b^5$. The pivot-straps $a^1$ and $b^1$ are pivoted at their lower ends to the lever L and at their upper ends to adjustable slide-blocks $a^6$, $b^6$, which are guided in the slotted ends of levers $a^7$, $b^7$ that are keyed by their hub-shaped ends $a^8$, $b^8$ to the square ends of transverse shafts $a^9$, $b^9$ that are supported in bearings of lugs $a^{10}$, $b^{10}$ on the bottom-plate $D^1$ of a casing D which incloses the two apparatus F and F¹. To the rear-ends of the shafts $a^9$, $b^9$ are keyed upright arms $a^{11}$, $b^{11}$, which are provided at their upper ends with pivoted and spring-pressed pawls $a^{12}$, $b^{12}$ that are placed in engagement with ratchet-wheels $a^{13}$, $b^{13}$ which are prevented from rotating in the opposite direction by spring-actuated check-pawls $a^{14}$, $b^{14}$ that are pivoted respectively to the side-wall of the casing D and to an intermediate post $D^2$ on the bottom-plate of the same. The ratchet-wheels $a^{13}$, $b^{13}$ are mounted on horizontal shafts $a^{15}$, $b^{15}$ which turn in bearings of lugs $a^{16}$, $b^{16}$ on the bottom-plate of the casing D, said shafts passing through the rear-wall of the casing and transmitting motion by intermediate bevel gear-wheels $d$, $d^1$ and $e$, $e^1$ to shafts $d^2$, $e^2$, which extend in opposite direction to each other and actuate respectively the counters C and C¹, shown in Fig. 2. To the rear of each ratchet-wheel $a^{13}$ and $b^{13}$ is applied a disk $a^{17}$ and $b^{17}$, of somewhat smaller diameter than the diameter of the ratchet-wheel, said disks serving for receiving the pawls $a^{12}$, $b^{12}$ when they are shifted with the shafts $a^9$, $b^9$ in backward direction, so as to be placed out of engagement with the ratchet-wheels $a^{13}$, $b^{13}$. Below the pawls $a^{12}$, $b^{12}$ are arranged on the upright arms $a^{11}$, $b^{11}$ stop-screws $a^{18}$, $b^{18}$ by which the downward motion of the pawls is limited.

The straps $a^2$, $b^2$ connect the levers L, L¹ by means of adjustable slide-blocks $f^1$, $g^1$ with the slotted upper arms of elbow-levers $f$, $g$ that are fulcrumed to the front-wall of the casing D, the lower fork-shaped arms of the elbow-levers $f$, $g$ engaging by pins $f^4$, $g^4$ the circumferential grooves of movable members $f^2$, $g^2$ of clutches placed on horizontal shafts $f^3$, $g^3$. The forked arms of the elbow-levers $f$ and $g$ shift the movable clutch-members $f^2$, $g^2$ away from the stationary members $f^5$, $g^5$ of the clutches whenever the respective levers L, L¹ are actuated by the respective steps 1 and 2. The movable clutch-members $f^2$, $g^2$ are provided at their ends adjacent to the stationary members with pins $f^6$, $g^6$ which engage corresponding sockets in the stationary members $f^5$, $g^5$ as soon as the elbow-shaped levers $f$, $g$ are returned into their normal position, which return motion is assisted by helical springs $f^7$, $g^7$ which connect the forked arms of the elbow-levers $f$, $g$ with stationary points on the casing D, as shown clearly in Figs. 3 and 4. To the lower forked arms of the elbow-levers $f$ and $g$ are pivoted L-shaped locking arms $f^8$, $g^8$, which, by means of projecting noses $f^9$, $g^9$ at their under-sides, engage stationary projections $f^{10}$, $g^{10}$ on the front-wall of the casing D, so as to hold the fulcrumed elbow-levers $f$ and $g$ and the movable clutch-members in position after the latter are moved out of mesh with the stationary clutch-members. The pusher-rods $a^5$, $b^5$ are located below the ends of the locking arms $f^8$, $g^8$ and are guided at their upper ends in suitable guide-lugs on the casing D, so that on the lifting of the levers L, L¹ the pusher-rods lift the locking arms $f^8$ and $g^8$ respectively and permit the return of the elbow-levers $f$ and $g$ under the influence of their springs $f^7$ and $g^7$ into their normal position and the return of the clutch-members $f^2$, $g^2$ into mesh with the stationary members $f^5$, $g^5$ of the clutches. The elbow-levers $f$ and $g$, together with the movable clutch-members and the locking arms, form guard devices for preventing the return of the levers L, L¹ until the clutch-members are returned into mesh with each other by the actuations of the steps connected therewith. Slightly above the locking arms $f^8$, $g^8$ are arranged stationary stops $q$, $q^1$ which project forward from the front-wall of the casing D, and which are so arranged that the ends of the arms $f^8$, $g^8$ clear the edge of the stops $q$, $q^1$ when they are lifted by the pusher-rods $b^5$ and $a^5$ respectively. The faces of the stops $q$, $q^1$ are inclined toward the ends of the locking arms $f^8$, $g^8$ and serve for receiving the ends of said arms on the depressions of the lower and upper steps by the ingoing passenger and the depressions of the upper and lower steps by the outgoing passenger, so as to permit in each case the return of these steps with the levers L, L¹ actuated thereby, and of all the parts connected therewith, into their normal position before the next actuation of the apparatus F, F¹ and registration of the counters C, C¹ take place.

The bracket-arms $a^3$, $b^3$ are provided with slotted horizontal portions which are connected by means of pivot-straps $h$ and $i$ with the slotted front-ends of fulcrumed levers $h^1$ and $i^1$, which are keyed to the horizontal shafts $g^3$, $f^3$ below the bottom-plate of the casing D. To these shafts are also keyed rearwardly-extending forked arms $h^2$, $i^2$, which are connected by means of pivot-pins $h^3$, $i^3$ with the lower slotted ends of connecting rods $h^4$, $i^4$, the upper ends of which are applied to the front-ends of T-shaped levers $h^5$, $i^5$ which are fulcrumed at the middle portions of their shanks to stationary uprights $h^6$, $i^6$ that are located on the bottom-plate of the casing D. The lower slotted ends of the shanks of the T-shaped levers $h^5$, $i^5$ engage pins $h^7$, $i^7$ on yoke-shaped levers $h^8$, $i^8$, which are pivoted at their lower ends to lugs $h^9$, $i^9$ on the under-side of the bottom-plate of the casing D, as shown in Figs. 7 and 8. The yoke-shaped levers $h^8$, $i^8$ extend respectively over the transverse shafts $b^9$, $a^9$ and engage sleeves $h^{10}$, $i^{10}$, which are keyed to the shafts $b^9$, $a^9$, by pins $h^{11}$, $i^{11}$ the grooved circumference of said sleeves, as shown in Fig. 8. The grooved circumference of the sleeves permits them to rotate with the shafts $b^9$, $a^9$, while the pins $h^{11}$, $i^{11}$ of the yoke-shaped levers serve for shifting the shafts $b^9$, $a^9$ in forward and backward direction for a short distance by the actuations of the T-shaped levers $h^5$, $i^5$, so as to move the actuating pawls $b^{12}$, $a^{12}$ out of engagement with the ratchet-wheels $b^{13}$, $a^{13}$ for clearing the latter and dropping onto the smooth circumference of the disks $b^{17}$, $a^{17}$ adjacent thereto, or return said pawls $b^{12}$, $a^{12}$ into engagement with the ratchet-wheels; in other words, so as to place the pawls out of mesh with the ratchet-wheels and back into mesh with the same, according as the ratchet-wheels are to be operated or not.

The pivot-straps $a^4$, $b^4$ are adjustably connected with the slotted ends of crank-arms $m$ and $n$, which are keyed to the front-ends of transverse shafts $m^1$, $n^1$ that are supported in bearings of lugs $m^x$, $n^x$ on the underside of the bottom-plate of the casing D and extended in backward direction below the same. To the rear-portions of the shafts $m^1$, $n^1$ are keyed crank-arms $m^2$, $n^2$, which are slotted at their lower ends and placed in engagement with pins $m^3$, $n^3$ at the lower ends of vertically-reciprocating pivot-links $m^4$, $n^4$ that are guided in corresponding openings in the bottom-plate of the casing D, and pivoted at their upper ends to ears of double hooks $m^5$, $n^5$, which hooks serve to engage the rear-ends of the T-shaped levers $h^5$, $i^5$ at the moment when the same are in their uppermost position, as shown in Fig. 7. The double hooks $m^5$, $n^5$ are provided at their lower ends, near their pivots, each with two forwardly-projecting lugs $m^6$, $n^6$ that engage stationary side-recessed standards $m^7$, $n^7$ which are supported in the bottom-plate of the casing D, so that when the crank-arms $m$, $n$ are moved in upward direction by the levers L, $L^1$, as shown in dotted lines in Fig. 3, the crank-arms $m^2$, $n^2$ move the connecting pivot-links $m^4$, $n^4$ in upward direction and produce by the abutting of the lugs $m^6$, $n^6$ of the double hooks against the upper ends of the recessed standards $m^7$, $n^7$ the forward tilting of the double hooks and their engagement with the transverse pins $h^x$, $i^x$ at the rear-ends of the fulcrumed T-shaped levers $h^5$, $i^5$. By the oscillating motion imparted to the T-shaped levers $h^5$, $i^5$ by the bracket-arms $a^4$, $b^4$, connecting straps $h$, $i$ and crank-levers $h^1$, $i^1$ and $h^2$, $i^2$, the T-shaped levers $h^5$, $i^5$ are tilted in forwardly-inclined position, as shown in Fig. 7, and produce by the intermediate yoke-shaped levers $h^8$, $i^8$ and the sleeves $h^{10}$, $i^{10}$ connected to the shafts $b^9$, $a^9$ the rearward shifting of the same. On the return of the weighted longer ends of the levers L, $L^1$ the crank-arms $m^4$, $n^4$ that actuate the double hooks $m^5$, $n^5$ pull the latter, together with the T-shaped levers $h^5$, $i^5$, in downward direction and backwardly-inclined position, shift the shafts $a^9$, $b^9$ by the yoke-shaped levers and sleeves in forward position, and return the pawls $a^{12}$, $b^{12}$ from their position on the circumference of the disks $a^{17}$, $b^{17}$ into mesh with the ratchet-wheels $a^{13}$, $b^{13}$. During the downward motion of the double hooks, the lugs of the same abut against the lower ends of the recesses of the standards $m^7$, $n^7$ and are thereby moved out of engagement with the pins $m^x$, $n^x$ of the T-shaped levers $h^5$, $i^5$ so as to clear the same ready for their next forward motion as caused by the next actuation of the levers L, $L^1$. The lower rearwardly-inclined position of the double hooks is shown clearly in dotted lines in Fig. 6, while the upper forwardly-inclined position of the double hooks $h^x$, $i^x$, when they are in engagement with the pins of the T-shaped levers $h^5$, $i^5$, is shown in Fig. 7.

All the bearings and standards located on the upper as well as on the under side of the bottom-plate $D^1$ of the casing D are preferably cast in one integral casting with the same, so as to reduce the expense of the passenger-controlled register. The bearings for the shafts $a^9$, $b^9$, $a^{15}$, $b^{15}$ and $m^1$, $n^1$ are drilled into the lugs by a boring machine into proper alinement with each other. The actuating parts are also cast of suitable metal, and the levers L, $L^1$ are made of wrought iron or steel. All the parts of both apparatus F and $F^1$ are exactly alike and can be readily replaced in case any one should become injured or broken. They can be readily assembled when required for use.

When the car arrives at the end of its trips or is returned to the barn, the steps are locked into inoperative position for being prevented from being actuated. This is accomplished by means of a locking device, which is actuated by a hand-lever $o$. The locking device consists of a crank-disk $o^1$ on a stud-shaft $o^2$, said crank-disk being connected by wrist-pins $o^3$ and pivot-rods $o^4$ located on transverse shafts $o^5$ below the steps, so as to bring cams $o^6$ below the steps and prevent thereby the lowering of the same while the car is standing at the end of the route or in the barn, when the employees have to go in and out of the car for cleaning the same. When the car is placed into service and started again, the steps 1 and 2 are released by turning the hand-lever and returning the cams into horizontal position, as shown in detail in Fig. 1ª. The passenger-controlled register is then ready for action for counting the passengers both when entering and leaving the car. The movable steps 1 and 2 are arranged above the ordinary steps of the car and guided thereon by suitable guide-pins $p$, the front-ends of the movable steps being extended by their bent-over edge-portions $p^1$ over the stationary steps, as shown in Fig. 1. To the ends of the lower stationary step 7 are attached rods 12 which are bent upwardly at the outer ends close to the edge of the lower movable step 1. The bent-up ends of the rods 12 are connected by a guard-rail $r$, which extends along the front-edge of the step 1, as shown in Figs. 1 and 2, and slightly above the plane of the same. This stationary guard-rail $r$ serves to give a foothold when several persons crowd into the car and until the lower step can be actuated. Sometimes several persons will depress the lower step and actuate the counter C once only, in which case the counter $C^1$ for the outgoing passengers will count the individual passengers and thereby correct or check the true number of passengers carried; but in case several passengers should crowd on the steps when leaving the car, then the counter $C^1$ may be operated for one passenger only, but the two counters will check each other and count up the number of passengers carried, with sufficient accuracy for placing a reliable check on the fares taken by the conductor and rung off on the fare-register operated by him.

The improved passenger-controlled register for street-cars is operated as follows: It may be premised that when the controlling apparatus F is in position for registering the ingoing passenger on the counter C by the depression of the first step, the second apparatus is placed out of position so as not to register on its counter; on the other hand, the depression of the second step operates the second controlling apparatus and produces the registration of the ingoing passenger by the first apparatus. This is accomplished by the lifting of the lever L by the depression of the first step and the consequent lifting of the pivot-straps $a^1$, $a^2$, $a^4$, the bracket-arm $a^3$ and the pusher-rod $a^5$. The pivot-strap $a^1$ raises the lever-arm $a^7$ and turns thereby the shaft $a^9$ on its axis. The shaft $a^9$ moves thereby the pawl-carrying arm and the pawl $a^{12}$ so as to cause the latter to drop under the influence of its spring into the next tooth of the ratchet-wheel $a^{13}$. The check-pawl prevents the ratchet-wheel from turning in the opposite direction. The strap $a$ produces the movement of the elbow-lever $f$ on its fulcrum and the shifting, by its lower forked arm, of the movable member of the clutch out of mesh with the stationary member. The locking arm $f^8$ is moved with the lower forked arm of the elbow-lever $f$ and placed by its hook $f^9$ into locking engagement with the projection $f^{10}$ so that the elbow-lever $f$ and the movable member of the clutch are locked in shifted position, whereby the lever L and all the straps connected therewith are held in raised position and prevented from returning until the locking lever L is released by the depression of the second step, and the elbow-lever $f$ and the movable clutch-member can be returned; in other words, the elbow-lever $f$, the locking arm $f^8$ and the clutch-member act as a guard device for the right-hand apparatus.

The bracket-arm $a^3$ operates by the strap $h$, lever $h^1$ and forked arm $h^2$, and moves the T-shaped lever $h^5$ by the intermediate strap $h^3$ in forwardly-inclined position, as shown in Fig. 7, ready for the engagement by the double hook $m^5$, and the simultaneous shifting of the shaft $b^9$ of the apparatus $F^1$ in backward direction by the T-shaped lever, pivoted yoke-shaped lever $h^8$ and sleeve $h^{10}$ keyed to the shaft $b^9$. The shifting action of the shaft $b^9$ produces the shifting of the pawl-carrying arm $b^{11}$ and pawl $b^{12}$ so as to move the latter out of engagement with the ratchet-wheel $b^{13}$ and on the disk adjacent thereto. The pivot-strap $a^4$ produces the actuation of the double hook $m^5$ by the intermediate mechanism, namely, the front crank-rod $m$, the rear crank-rod $m^2$, rod $m^4$ and the rear-standard $m^7$, so as to raise thereby the double hook $m^5$ and produce the engagement of the same with the pins $h^x$ on the T-shaped lever $h^5$.

The pusher-rod $a^5$ produces the lifting of the locking arm $g^8$ of the second apparatus and holds it in raised position, out of locking engagement with the projection $g^{10}$. As soon as the pressure on the step 1 is released, that is to say, as soon as the foot of the passenger is taken away from the lower step and the other foot placed on the second step, the lever L is prevented from returning by the guard clutch device of the apparatus F. This holds the working parts connected with the lever L in the position in which they have been placed by the same. They cannot leave this position until the upper step 2 is depressed, that is to say, as soon as the pressure of one foot of the passenger is taken away from the lower step and the other foot placed on the upper step. As soon as the upper step is depressed by the foot of the entering passenger, the lever $L^1$ is raised and the pivot-straps $b^1$, $b^2$, $b^4$, the bracket-arm $b^3$ and the pusher-rod $b^5$ are lifted simultaneously by the same with the following result: The pusher-rod $b^5$ lifts the locking arm $f^8$ out of engagement with the projection $f^{10}$, and produces thereby the immediate return of the lever L by gravity into its lower position. The movable clutch-member $f^2$ is returned under the influence of the spring $f^7$ into mesh with the stationary clutch-member $f^5$. The strap $a^1$ and the lever-arm $a^2$ are returned into their former position, and the shaft $a^9$ turned by the lever $a^7$ toward the right, in opposite direction to its former motion, so that the pawl $a^{12}$ engages the ratchet-wheel $a^{13}$ and moves it for the distance of one tooth, which motion is transmitted by the shaft $a^{15}$ and the intermediate mechanism to the counter C so that the ingoing passenger is registered. Simultaneously therewith the strap $b^1$ lifts the lever-arm $b^7$ and turns the shaft $b^9$ and the pawl-carrying arm $b^{11}$ toward the left so that the pawl $b^{12}$ is quickly moved over the disk $b^{17}$ without affecting the ratchet-wheel $b^{13}$ and the counter $C^1$. Simultaneously the parts operated by the bracket-arm $a^3$ and pivot-strap $a^4$, namely, the shifting mechanism of the shaft $b^9$, consisting of the T-shaped lever $h^5$, the yoke-shaped lever $h^8$ and the double hook $m^5$, are returned into their normal position, as shown in Figs. 3 and 6, the slots in the connecting rod $h^4$, the T-shaped lever $h^5$ and yoke-shaped lever $H^8$ permitting the proper play for the movement of the parts. The shifting mechanism returns the shaft $b^9$ into its forward position, and thereby the pawl $b^{12}$ into engagement with the ratchet-wheel $b^{13}$. The pusher-rod $b^5$ is likewise returned into its normal position. The lifting of the pivot-strap $b^2$ produces the actuation of the elbow-shaped lever $g$ and the shifting of the movable clutch-member $g^2$ out of mesh with the stationary member $g^5$. As the locking arm $g^8$ is held in raised position by the lifting of the pivot-strap $a^5$, its end cannot be dropped into engagement with the projection $g^{10}$, but is pushed by the oscillating movement of the elbow-shaped lever $g$ onto the inclined face of the stationary stop $q^1$, in which position the locking arm is held until the lever $L^1$ is returned into its former position. The lifting of the pivot-strap $b^1$ by the lever $L^1$, due to the depression of the upper step 2, produces by the lever-arm $b^7$ the turning of the shaft $b^9$ on its axis, the swinging of the pawl-carrying arm $b^{11}$ and pawl $b^{12}$, so that the latter drops into the next tooth of the pawl $b^{13}$ of the apparatus $F^1$. The bracket-arm $b^3$ and pivot-strap $b^4$ produce simultaneously the actuation of the switching mechanism of the apparatus F and the shifting of the shaft $a^9$ in backward direction and the raising of the double hook $n^5$ into engagement with the pins $i^x$ of the T-shaped lever $i^5$. The pawl $a^{12}$ is thereby placed on the circumference of the disk $a^{17}$ so as to prevent it from actuating the ratchet-wheel $a^{13}$ during the return of the lever $L^1$ into its former position. As soon as the pressure on the step 2 is released by the foot of the passenger leaving the same, the lever $L^1$ is permitted to return by gravity into its lower normal position, together with all the parts connected with it. As the guard device of the apparatus $F^1$ is not in locked position, the end of the locking arm $g^8$ being on the stationary stop $q^1$, the locking arm $g^8$ slips clear of the same by the return motion of the bell crank-lever $g$, so that the lever $L^1$ is not held in raised position, but is instantly returned into its lower position. The return of the lever $L^1$ produces the oscillation of the pawl $b^{12}$ and the simultaneous actuation of the ratchet-wheel $b^{13}$ simultaneously with the return action of the shifting mechanism $h^5$, $h^8$ and $m^5$, while the shifting mechanism of apparatus F is likewise returned into normal position by the motion of the shaft $a^9$ in forward direction owing to the return motion of the shifting mechanism $i^5$, $i^8$ and $n^5$. All the parts of the register are thus returned into normal position and ready for the next actuation either by an ingoing or by an outgoing passenger. The depression of the steps 1 and 2 one after the other produces the registration of the ingoing passenger on counter C, while the depression of the steps 2 and 1 one after the other by an outgoing passenger produces by the actuation of the apparatus the registration of the passenger on the counter $C^1$, whereby a double registration of the passenger is obtained.

In case any one steps accidentally on the first step but does not go into the car, jumping off the same, no registration is accomplished on the counter C as for an ingoing passenger. The next ingoing passenger, on depressing the upper step, or an outgoing passenger, depressing the upper step, will return the controlling apparatus F, $F^1$ to their normal position. One counter forms a check for the other counter, both securing the correct and reliable registration of the passengers when entering or leaving the car.

The return or double control by the outgoing passengers is for the purpose of controlling the number of passengers that have entered and left the car.

The operating parts are inclosed and protected against dust by the casing D. Only the parts that are connected with the step-controlled levers L, $L^1$ are outside of the casing and can be readily cleaned. By the actuation of the passenger-registering apparatus a full and reliable count of the passengers who enter and leave the car, and thereby a control of the fares paid by the same to the conductor, is obtained, as the conductor cannot meddle with the register nor in any way interfere with the proper working of the same. The great losses which are at present incurred by the dishonesty of the conductors by the so-called "knocking down" of fares can, by the use of the passenger-controlling apparatus, be almost entirely prevented.

In cars in which passengers enter at one side of the car when going in one direction and at the other side when the car goes in the other direction, two separate passenger-controlling apparatus are required, one being in action when the car is moving on its outgoing trip and the other when the car is moving on its return trip.

The present fare-registering devices may be retained, but as they do not sufficiently control the fares taken in by the conductor the double passenger-controlling apparatus is introduced so as to count by their independent actuations the number of passengers entering and leaving the car, and thereby the fares which should be collected by the conductor.

Having thus described my invention, I claim as new and desire to secure by Letters Patent:

1. In a passenger-controlled register for cars, the combination of the upper and lower movable steps, fulcrumed levers actuated by the depression of said steps respectively, two intermediate passenger-controlled apparatus mechanically connected with and operated by said levers, and counters mechanically operated by the intermediate passenger-controlled apparatus.

2. In a passenger-controlled register for cars, the combination of the upper and lower movable steps of the car, two fulcrumed and weighted levers respectively connected with said steps and actuated by the depression of the steps, two intermediate passenger-controlled apparatus mechanically connected with said levers, counters mechanically connected with and actuated by the intermediate passenger-controlled apparatus, and means for returning the operating parts into normal position after the actuation of the fulcrumed levers by the depression of the movable steps.

3. In a passenger-controlled register for cars, the combination of the upper and lower movable steps, two fulcrumed and weighted levers actuated by the depressions of the movable steps, two intermediate passenger-controlled apparatus connected with said levers, and comprising each a clutch-operated guard device, a rock-shaft, means for rocking the same, a pawl and ratchet mechanism operated by said rock-shaft, means for shifting the rock-shaft for moving the pawl into or out of engagement with the ratchet-wheel, a counter, means for connecting the ratchet-wheel with the counter, and a releasing device for the guard device for returning all the operating parts into normal position after the actuation of the levers by the successive depressions of the steps of the car.

4. In a passenger-controlled register for cars, the combination of the upper and lower movable steps, fulcrumed actuating levers, connected with and actuated by the depression of the movable steps, two intermediate passenger-controlled apparatus comprising each a clutch-operated guard device, a releasing device for said guard device, a pawl and ratchet mechanism, rock-shafts for alternately releasing and actuating said pawl and ratchet mechanism, means connecting the levers and rock-shafts for actuating the rock-shafts, a shifting mechanism for said rock-shaft, a counter for each apparatus, and an intermediate mechanism between the ratchet-wheel and the counter for operating the latter.

5. In a passenger-controlled register for cars, the combination of the upper and lower movable steps, two fulcrumed actuating levers operated by the depression of the steps, three pivot-straps, a bracket-arm and a pusher-rod connected with each actuating lever, rock-shafts operated by the first pair of pivot-straps, clutch-operating elbow-levers operated by the second pair of pivot-straps, locking guard devices operated by the elbow-levers of the clutch-members and released by the pusher-rods, shifting mechanisms for the rock-shafts operated by the pairs of bracket-arms and third set of pivot-straps, pawl and ratchet mechanisms operated by the rock-shafts, two counters, and intermediate mechanism between the ratchet-wheels and the counters for operating the latter.

6. A passenger-controlled register for cars, comprising two fulcrumed levers actuated by the movable steps of the car, three pivot-straps, a bracket-arm and a pusher-rod connected with each lever, two rock-shafts connected with the first set of pivot-straps, two clutch devices the movable members of which are connected by elbow-levers with the second set of pivot-straps, two locking guard devices connected with the elbow-levers of the clutch devices and the pusher-rods for releasing the locking guard devices, two shifting mechanisms connected with the rock-shafts, two pawl and ratchet-wheel mechanisms operated by the shifting and rocking motion imparted to the rock-shafts, two counters, and intermediate transmitting mechanisms between the ratchet-wheels and counters for actuating the latter.

7. A passenger-controlled register for cars, comprising upper and lower movable steps of the car, two fulcrumed levers actuated by the movable steps, three pivot-straps, a bracket-arm and a pusher-rod connected with each lever, two rock-shafts connected with the first set of pivot-straps, two clutch devices the movable members of which are connected by elbow-levers with the second set of pivot-straps, two locking guard devices connected with the elbow-levers of the clutch devices, two stationary stops adjacent to the ends of the locking guard devices, two pusher-rods for releasing the locking guard devices, two shifting mechanisms connected with the set of bracket-arms for shifting the rock-shafts into backward and forward position, two pawl and ratchet-wheel mechanisms operated intermittently by the rock-shafts, two counters, and intermediate transmitting mechanisms between the ratchet-wheels and counters for actuating the latter.

8. In a passenger-controlled register for cars, the combination of two fulcrumed levers actuated by the depression of the steps of the car, three pivot-straps, a bracket-arm and a pusher-rod connected with each lever, two rock-shafts operated by the first pair of pivot-straps, two elbow-levers operated by the second pair of pivot-straps, two clutch devices operated by said elbow-levers, locking arms pivoted to the elbow-levers, said locking arms being actuated by the pair of pusher-rods, two projections for engaging the locking arms, two stationary stops adapted to receive the locking arms when they are not to be locked, two rock-shafts, means for turning said rock-shafts, two shifting mechanisms connected with the rock-shafts and operated by the bracket-arms and third pair of pivot-straps, two oscillating arms carried on said rock-shafts, a pawl on each of said arms, two ratchet-wheels, a smooth disk adjacent to each ratchet-wheel, two counters, and intermediate mechanisms for transmitting motion from the ratchet-wheels to the counters.

9. In a passenger-controlled register for cars, a counter-actuating apparatus comprising a rock-shaft, means for turning the same, a shifting mechanism for the rock-shaft, a pawl and ratchet-wheel mechanism operated by the shifting motion of the rock-shaft, a counter, intermediate mechanism between the ratchet-wheel and the counter, a locking guard device for holding the rock-shaft and shifting mechanism in shifted position after actuation, and means for releasing the guard device and permitting the return of the rock-shaft and shifting mechanism into normal position.

10. In a passenger-controlled register for cars, the combination of two fulcrumed levers, a rock-shaft operated by one of the levers for rocking the shaft on its axis, a shifting mechanism for said rock-shaft operated by the other lever for shifting the rock-shaft in backward and forward direction, a pawl and ratchet-wheel mechanism operated by the rock-shaft, a counter, and intermediate mechanism between the ratchet-wheel and counter.

11. In a passenger-controlled register for cars, the combination of two fulcrumed actuating levers, a rock-shaft connected with one of the levers for rocking it on its axis, a shifting mechanism for the rock-shaft operated by the other lever for shifting the rock-shaft in backward and forward direction, a pawl and ratchet-wheel mechanism actuated by the rock-shaft when in forward position, a disk adjacent to said ratchet-wheel for receiving the pawl when the rock-shaft is shifted in backward position, a counter, and intermediate mechanism between the ratchet-wheel and counter for operating the latter when the pawl is in engagement with the ratchet-wheel.

12. In a passenger-controlled register for cars, the combination, with two actuating levers, of a rock-shaft connected with one of the levers for rocking the shaft on its axis, a clutch-sleeve on said rock-shaft, a pawl and ratchet-wheel mechanism operated by said rock-shaft, and a shifting mechanism connected with the other lever for shifting the rock-shaft in backward and forward direction and the pawl respectively into and out of engagement with the ratchet-wheel, said shifting mechanism consisting of an oscillating T-shaped lever, a yoke-shaped lever connecting the T-shaped lever with the clutch-sleeve on the rock-shaft, and a double return lever adapted to engage the T-shaped lever with the rock-shaft into normal position.

13. In a passenger-controlled register for cars, the combination of the upper and lower movable steps, two actuating levers operated by the steps, a rock-shaft operated by one of the levers for rocking the same, a pawl and ratchet-wheel mechanism operated by the rock-shaft when in normal position, and a shifting mechanism for shifting the rock-shaft in backward position and moving the pawl out of mesh with the ratchet-wheel, said shifting mechanism consisting of a clutch-sleeve keyed to the rock-shaft, a fulcrumed T-shaped lever, a yoke-shaped lever connecting said lever with the clutch-sleeve on the rock-shaft, and a double hook adapted to engage the T-shaped lever and return the rock-shaft forward into its normal position.

14. In a passenger-controlled register for cars, the combination of movable steps of the car, actuating levers operated by the steps, a counter, and intermediate mechanism between the levers and counter for actuating the latter once for the successive actuation of both levers, of a locking clutch device consisting of a stationary clutch-member, a movable clutch-member, a fulcrumed and spring-actuated elbow-lever connected by one arm with one of the levers and by its lower arm with the movable clutch-member, and a locking arm pivoted to said elbow-lever, a projection for locking said arm and preventing the return of the movable clutch-member and lever connected therewith into normal position, and means for releasing the locking arm and permitting the return of the levers and parts connected therewith into normal position.

15. In a passenger-controlled register for cars, the combination of the upper and lower movable steps of the car, actuating levers operated by the movable steps, a counter, and intermediate mechanism between the counter and levers for actuating the latter once with the successive actuations of both levers, a fulcrumed and spring-actuated elbow-lever operated by one of the levers, and a locking clutch device consisting of a stationary clutch-member, a movable clutch-member engaged by one arm of the elbow-lever, a locking arm pivoted to said arm and provided with a stop, a stationary projection for engaging said locking arm, a stationary stop near the end of the locking arm, and a pusher-rod engaging the end of the locking arm and permitting it to slide on the stop for preventing the locking of the arm and permitting the return of all the parts connected with the levers into normal position.

In testimony, that I claim the foregoing as my invention, I have signed my name in presence of two subscribing witnesses.

OTTO SPECKENBACH.

Witnesses:
PAUL GOEPEL,
HENRY J. SUHRBIER.